(12) United States Patent
Fedoseyev et al.

(10) Patent No.: US 6,923,619 B2
(45) Date of Patent: Aug. 2, 2005

(54) INTEGRATED BLADE COOLER FOR ELECTRONIC COMPONENTS

(75) Inventors: Lev Fedoseyev, El Cajon, CA (US); Daniel Schaefer, Palm Desert, CA (US); Edward Lopatinsky, San Diego, CA (US); Saveliy Rosenfeld, San Diego, CA (US)

(73) Assignee: Rotys Inc., San Diego, CA (US)

( * ) Notice: Subject to any disclaimer, the term of this patent is extended or adjusted under 35 U.S.C. 154(b) by 78 days.

(21) Appl. No.: 10/634,325

(22) Filed: Aug. 5, 2003

(65) Prior Publication Data

US 2005/0031447 A1 Feb. 10, 2005

(51) Int. Cl.[7] .............................. F04D 17/08; H05K 7/20
(52) U.S. Cl. .......................... 415/176; 416/3; 415/206; 361/697
(58) Field of Search ................................. 416/3, 186 R, 416/185, 182, 187; 415/176, 177, 175, 178, 206, 224; 417/423.1, 423.7; 165/80.3, 185, 121; 361/695, 697

(56) References Cited

U.S. PATENT DOCUMENTS 5,995,367 A * 11/1999 Smith et al. ................. 361/695

FOREIGN PATENT DOCUMENTS

JP                08195456 A  *  7/1996  ......... H01L/23/467

* cited by examiner

Primary Examiner—Edward K. Look
Assistant Examiner—Richard A. Edgar

(57) ABSTRACT

An integrated blade cooler for electronic components comprises a blower with a radial impeller and a casing, an electric drive with a magnetic rotor and a stator, and a heatsink with fins and a base. The casing has an inlet and an outlet; the impeller comprises blades, a backplate disk and an axis of rotation; and the fins are clothed in a cover plate with an outflow opening that being coincided with the inlet. The stator is made as a part of the casing and as a printed circuit board, and the radial impeller comprises magnetic blades serving as the magnetic rotor. At least part of the cover plate is made as a part of the casing thus the outflow opening concise with the inlet.

17 Claims, 9 Drawing Sheets

INTEGRATED BLADE COOLER FOR ELECTRONIC COMPONENTS

BACKGROUND OF THE INVENTION

The present invention relates generally to cooling systems. More particularly, the present invention relates to cooling systems for regulating the temperature of electronic components of electronic devices. The present invention is particularly, but not exclusively, useful for cooling systems that regulate the temperature of electronic components of blade servers.

The regulation of the temperature of electronic components like processors due to heat generated inside the housing of an electronic device like a blade server is an important consideration during the design of an electronic device. Cooling is important because if left unchecked, heat can cause electronic devices to malfunction during use or lead to premature device failure. As improvements in processor speed occur, the amount of heat generated by the faster processors also increases. Additionally, improved processors require larger power supplies and auxiliary components that generate increased amounts of heat and require improved systems for heat removal.

Another factor that aggravates the need for improved heat removal cooling systems is the trend towards making computing devices such as blade servers smaller and especially thinner. The trend toward smaller and thinner electronic devices having larger, faster processors renders the traditional heat removal cooling systems inadequate for several reasons. First, smaller devices having faster processors result in an increased density of heat producing electronic components leading to higher localized concentrations of heat. Also, a decreased amount of space is available for localized temperature regulating devices such as traditional heatsinks. Lastly, a decreased amount of space is available to create ventilation paths that pass by heat sources. Thus, traditional blower assemblies having an inlet from above the blower that ventilate the entire housing of the device are less effective or inapplicable in removing heat when used in smaller, thinner devices.

There are numerous designs of cooling systems for electronic devices that include a blower-assisted heatsink located directly at the electronic component. These conventional coolers had been using axial or radial blowers primarily. But, in spite of relatively high blower efficiency at regular size of axial and radial blowers, the blower efficiency drops dramatically when these blowers have been used for relatively small size cooling systems.

There are known devices of this type, for example, U.S. Pat. No. 6,196,300 "Heatsink". The device described in this US patent comprises an axial fan that produces a flow passing by heat-exchanging channels of the heatsink. The majority of inlets to the heat-exchanging channels are located just opposite of the axial fan's impeller with a certain number of said channels being placed radially in relation to the fan axle.

The axial fan produces sufficient air pressure. However, due to the weak airflow in the area adjacent to the fan axle, the conditions for cooling of the central part of the heatsink located underneath a hub of the fan are unfavorable. In this case non-uniform cooling of the heatsink and electronic components will take place. It does not allow obtaining good conditions for the heat-exchange process.

Centrifugal (radial) blowers are used more rarely in cooling device designs for the purpose of producing airflow. Specifically, U.S. Pat. No. 5,838,066 "Miniaturized cooling fan type heatsink for semiconductor device" offers a design employing a radial blower that is installed to the side of the heatsink. In one particular embodiment of this invention the cooling airflow passes by rectilinear means through the heat-exchanging channels of the heatsink.

However, placement of a centrifugal blower to the side of the heatsink increases the device size and reduces its effectiveness because the location of the radial blower leads to insufficient coordination between the direction of channel inlets and direction of airflow supplied from the blower. The loss in airflow energy results in the reduction of airflow speed in the heat-exchanging channels and the reduction of heat-exchange efficiency. A portion of airflow energy is also expended as friction against the casing that encloses the blower.

An invention described in the patent of Japan No. 8-195,456 "Cooler for electronic apparatus" comprises a radial blower enclosed in the casing and an electric drive located out of the casing. The blower is installed above the heat-exchanging channels of the heatsink. Another heatsink surface is made so that the possibility of thermal contact with an electronic device is provided for. The inlet of the radial blower faces the heatsink. The radial blower produces an airflow that passes by the heat-exchanging channels and then gets drawn into the inlet of said blower. Such electric drive placement visibly increases the thickness of the cooling device as a whole.

Thus, the main problem arises when using the radial blower assisted heatsink—on the one hand the placing of the electric drive inside the impeller of the blower leads to sufficient decreasing of the blower and thermal efficiency, and on other hand, placing of the electric drive outside of the blower impeller leads to sufficient increasing in size.

Therefore, it would be generally desirable to provide an apparatus that overcomes this problem associated with a cooler comprising a radial blower assisted heatsink and has a relatively high blower and thermal efficiency without the need to increase the volume and even with smaller volume, especially with a lesser thickness of the cooler.

SUMMARY OF THE INVENTION

According to the present invention an integrated blade cooler for electronic components comprises a heatsink, a blower with a radial impeller and a casing, and an electric drive with a magnetic rotor and a stator.

The general idea of the claimed invention is that the radial impeller of the blower comprises magnetic means and could serve as the magnetized rotor of the electric drive. Simultaneously, the stator of the electric drive is made as part of the casing of the blower and, in the best embodiment, as printed circuit board. Thus, the integrated blade cooler for electronic components realized as an integrated structure where the magnetized rotor of the electric drive is integrated with the radial impeller of the blower, and the stator of the electric drive is integrated with the casing. Therefore, on one hand there is no electric drive inside of the impeller thus providing high blower and thermal efficiency of the cooler; also, there is no volumetric electric drive outside of the impeller thus providing smaller size of the cooler.

In order to achieve these objectives, the blower comprises a radial impeller and a casing with an inlet and an outlet. The radial impeller comprises blades, a backplate disk and an axis of rotation. The electric drive comprises a magnetic rotor and a stator made as a part of the casing. The radial impeller comprises magnetic means serving as a magnetic rotor of the electric drive. The heatsink comprises heat-exchanging means clothed in a cover plate with an outflow opening and a base providing thermal contact with the electronic component and the heat exchanging means. The outflow opening of said cover plate being coincided with the inlet of the blower, thus cooling gas flows through the heat-exchanging means, the blower inlet, the radial impeller and the blower outlet in a series way. The stator could be made as printed circuit board. At least part of the cover plate could be made as a part of the casing so that the outflow opening of the heatsink serves as the inlet of the blower. The stator could be located perpendicularly to the axis of rotation. In this case said magnetic means should be magnetized in the direction parallel to the axis of rotation. All these embodiments additionally lower the thickness of the cooler.

In the further embodiments: At least part of the blades and/or backplate disk of the impeller could be magnetized and serve as the magnetic means. If there are magnetic blades, the more powerful magnetic field is when the radial impeller comprises a shroud made from the magnet-conducting material that contacts with the magnetic blades thus reinforcing an electromagnetic field. The radial impeller could further comprise a magnetic shroud. Used together and magnetized in the said direction said magnetic blades, magnetic backplate disk and magnetic shroud contacting with said blades give the best result,—this cooler has not only less thickness but it has also maximum magnetic field and, accordingly, maximum efficiency of the electric drive, which results in less electric energy consumed. The radial type impeller could be made as drum type impeller and the casing could have two outlets located on the opposite sides of said blower. It is also possible that a side part of the casing is made as several, at least three, elements like pillars, located at distances one from another forming several outlets of the blower, lowering the quantity of material.

In the one of the best embodiments of the invention the heatsink has a recess on the side of the outflow opening, and the blower is located in said recess. The depth of said recess could be so that the side of the casing of the blower opposite to the heatsink is located in about the same level as said cover plate of said heatsink. The recess with the blower could be located in the central part of the heatsink. The cooler in this embodiment has the minimum thickness and the maximum heat-exchanging surface (and, accordingly, maximum cooling effect and/or, as a result, minimum sizes).

DETAILED DESCRIPTION OF THE INVENTION

Claimed invention will be described in detail below with reference to the accompanying drawings. FIGS. 1–6A show embodiments of the present invention.

Figure 1:
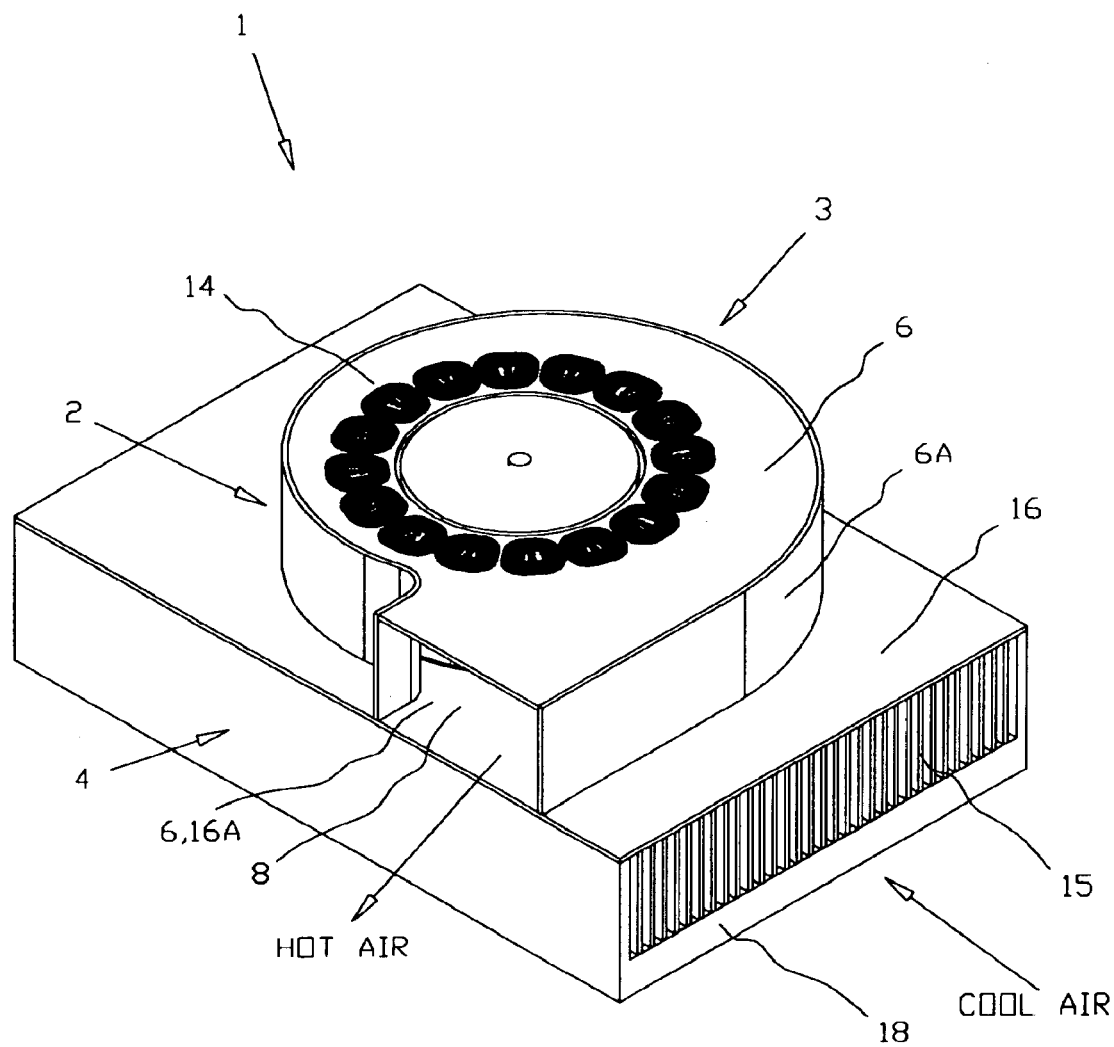
FIG. 1 is a perspective view showing the first embodiment of the present invention—the integrated blade cooler for electronic components.
Figure 1A:
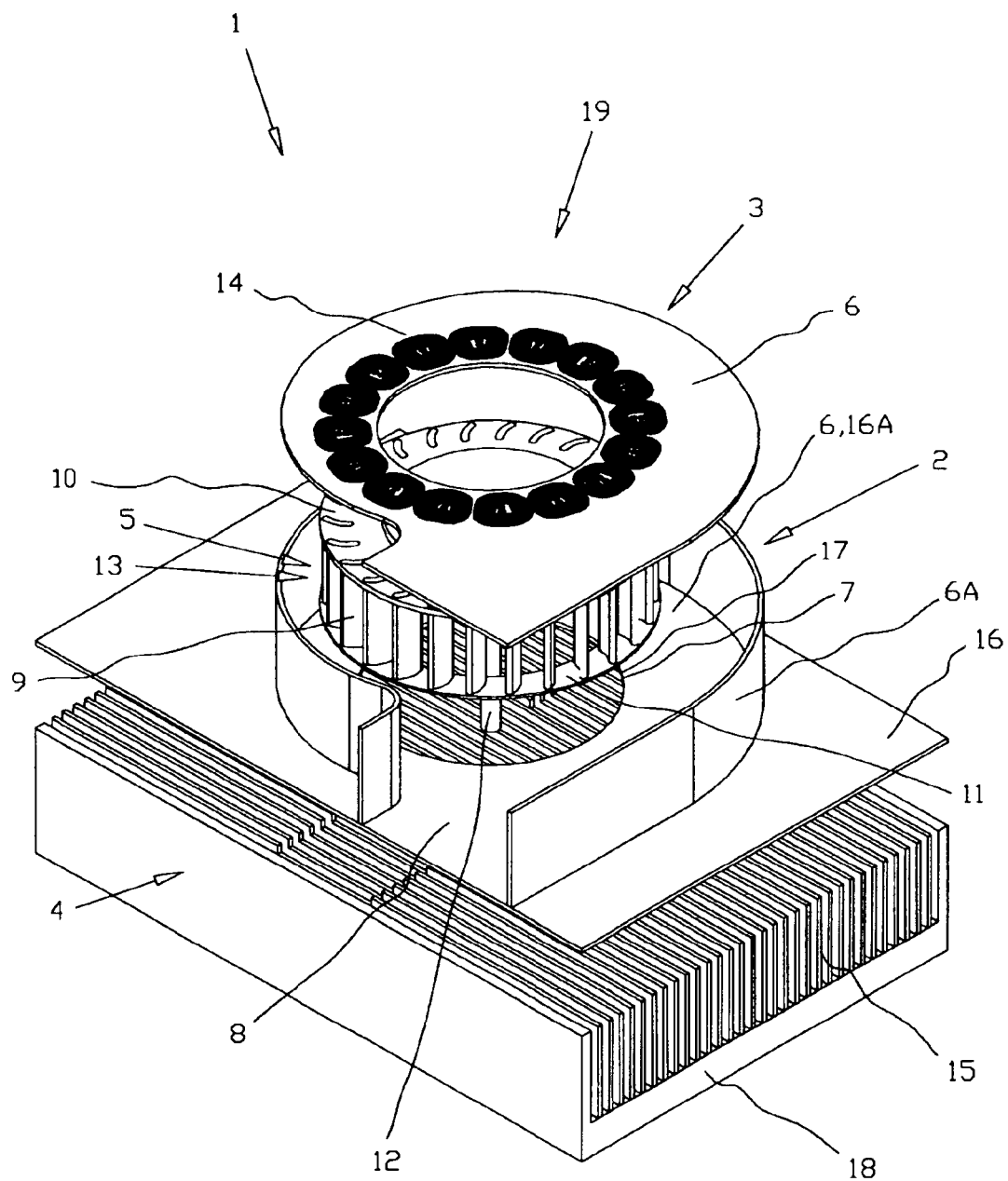
FIG. 1A is an exploded view showing the first embodiment of the integrated blade cooler for electronic components with fins as heat-exchanging means.
Figure 1B:
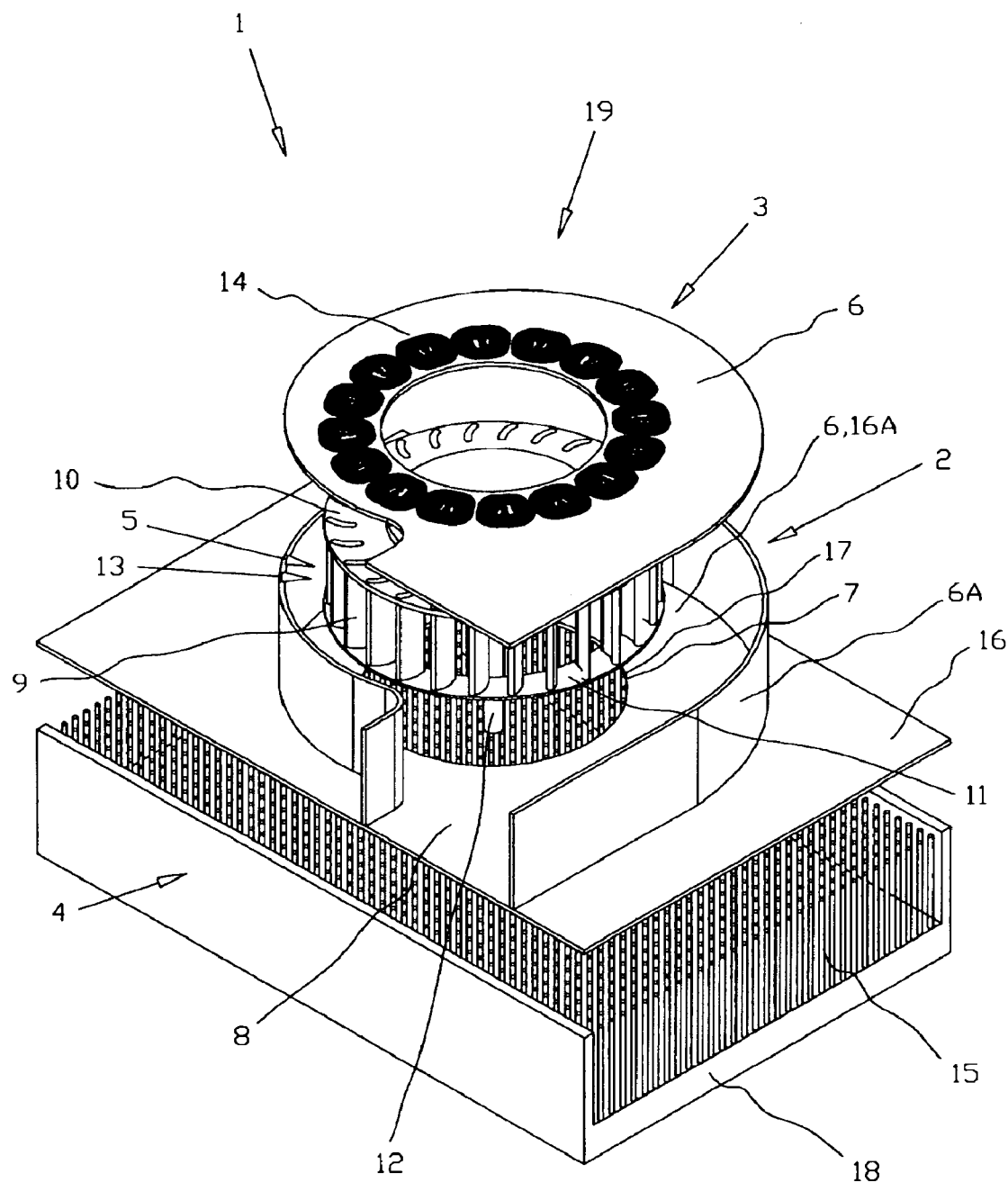
FIG. 1B is an exploded view showing the first embodiment of the integrated blade cooler for electronic components with pins as heat-exchanging means.
Figure 2:
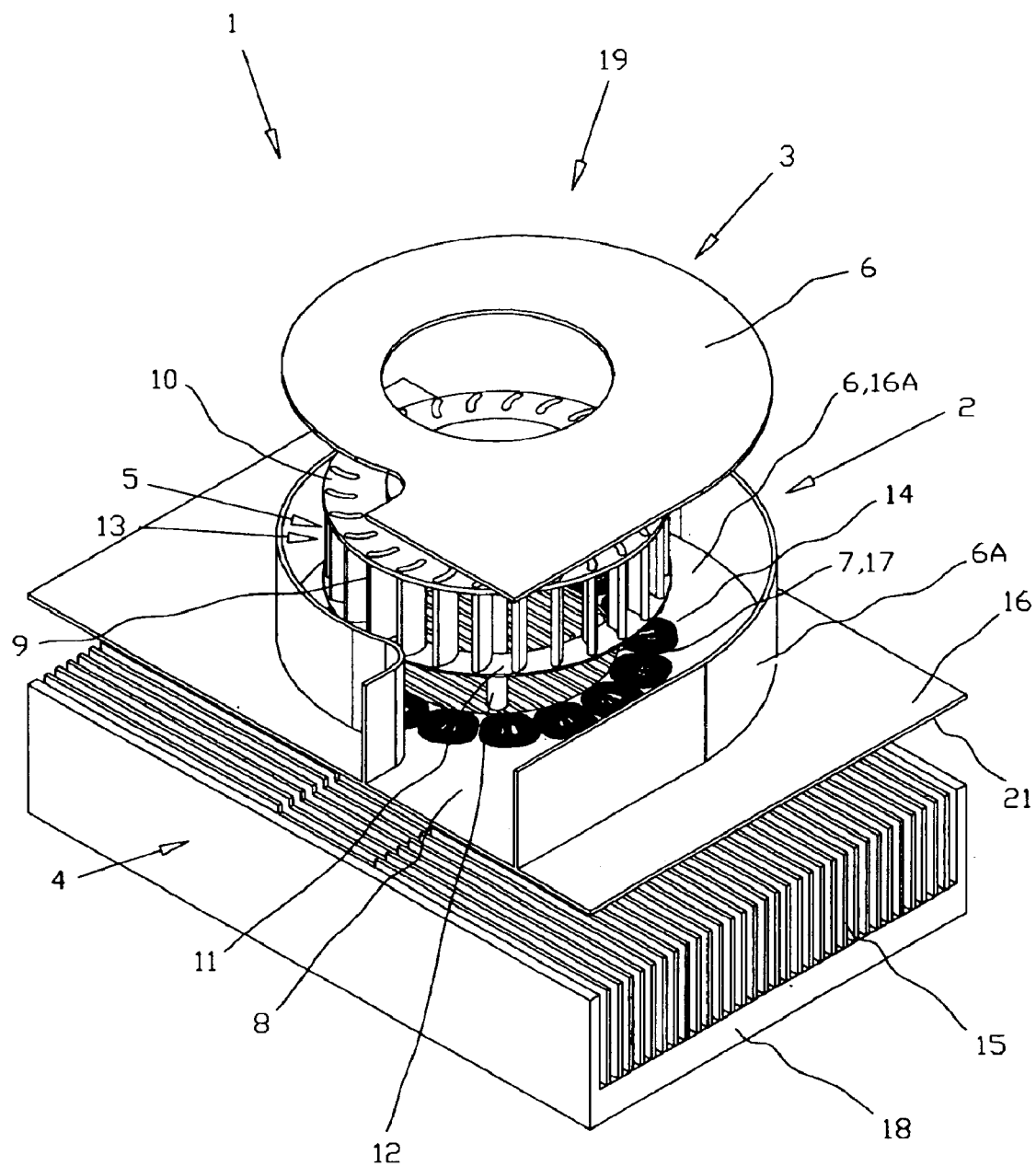
FIG. 2 is an exploded view showing the second embodiment of the integrated blade cooler for electronic components when the stator is made as a part of the cover plate of the heatsink.
Figure 3:
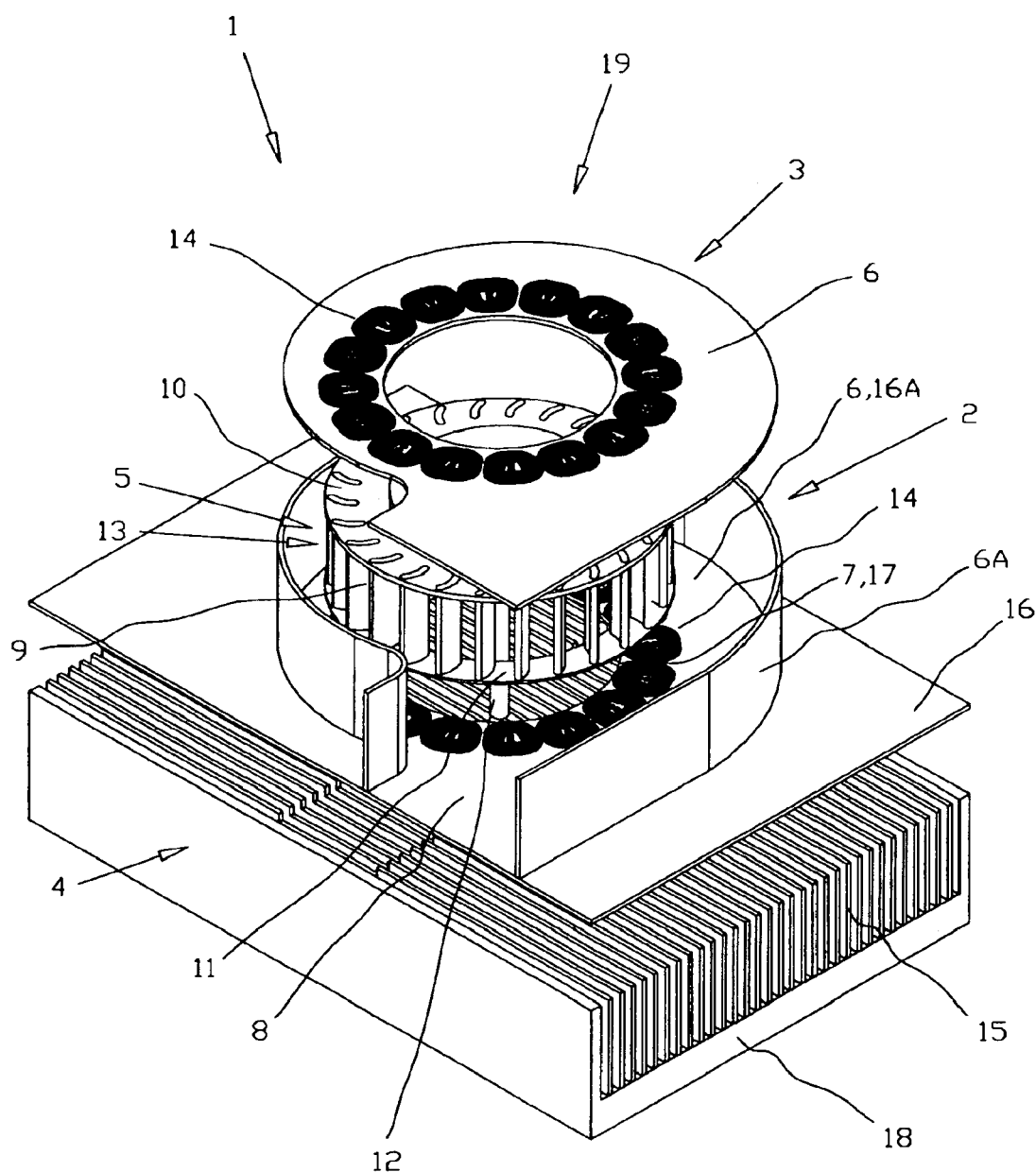
FIG. 3 is an exploded view showing the third embodiment of the integrated blade cooler for electronic components when the cooler has two stators.
Figure 4:
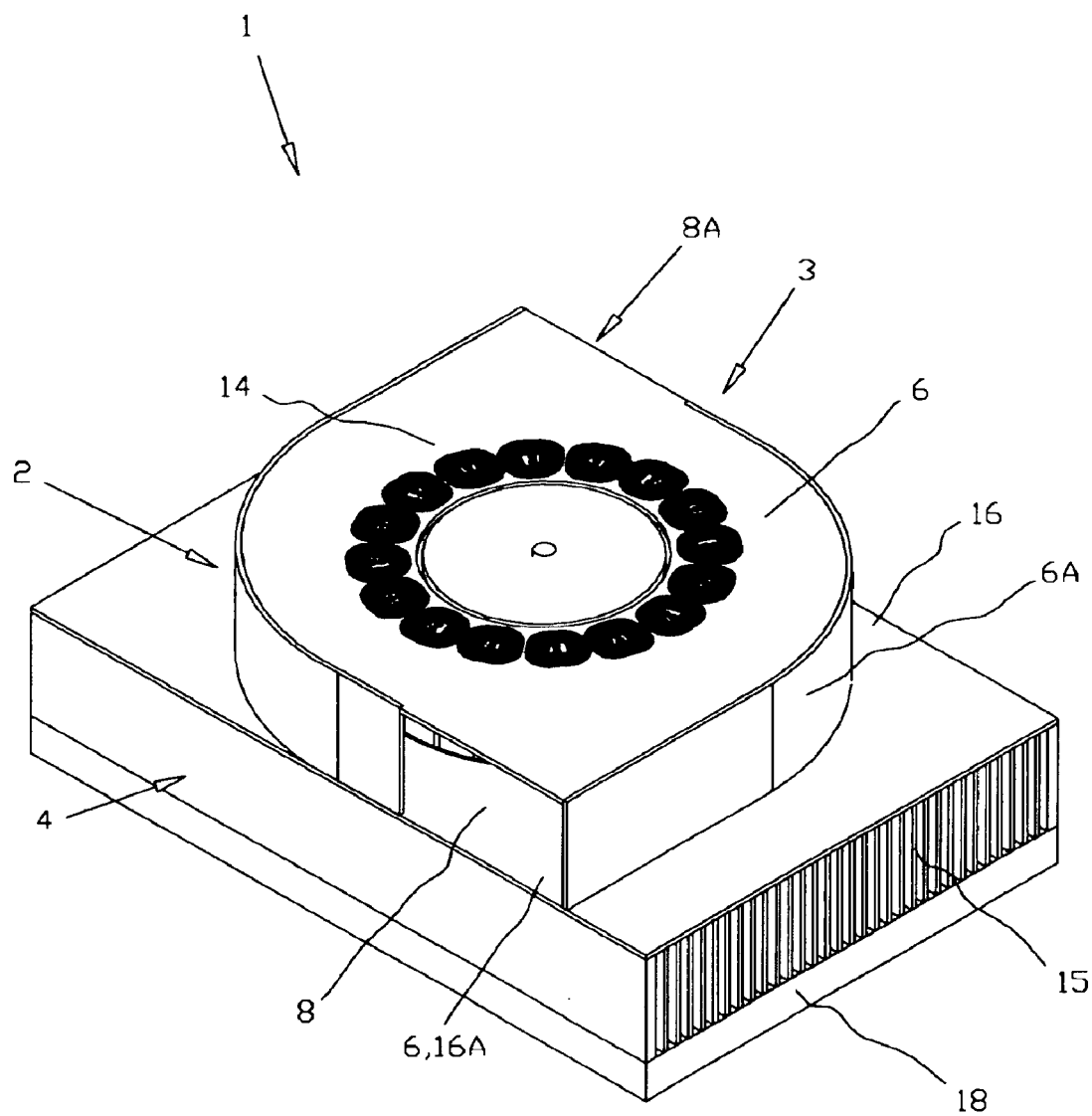
FIG. 4 is a perspective view showing the fourth embodiment of the integrated blade cooler for electronic components when the side part of the casing has two outlets.
Figure 5:
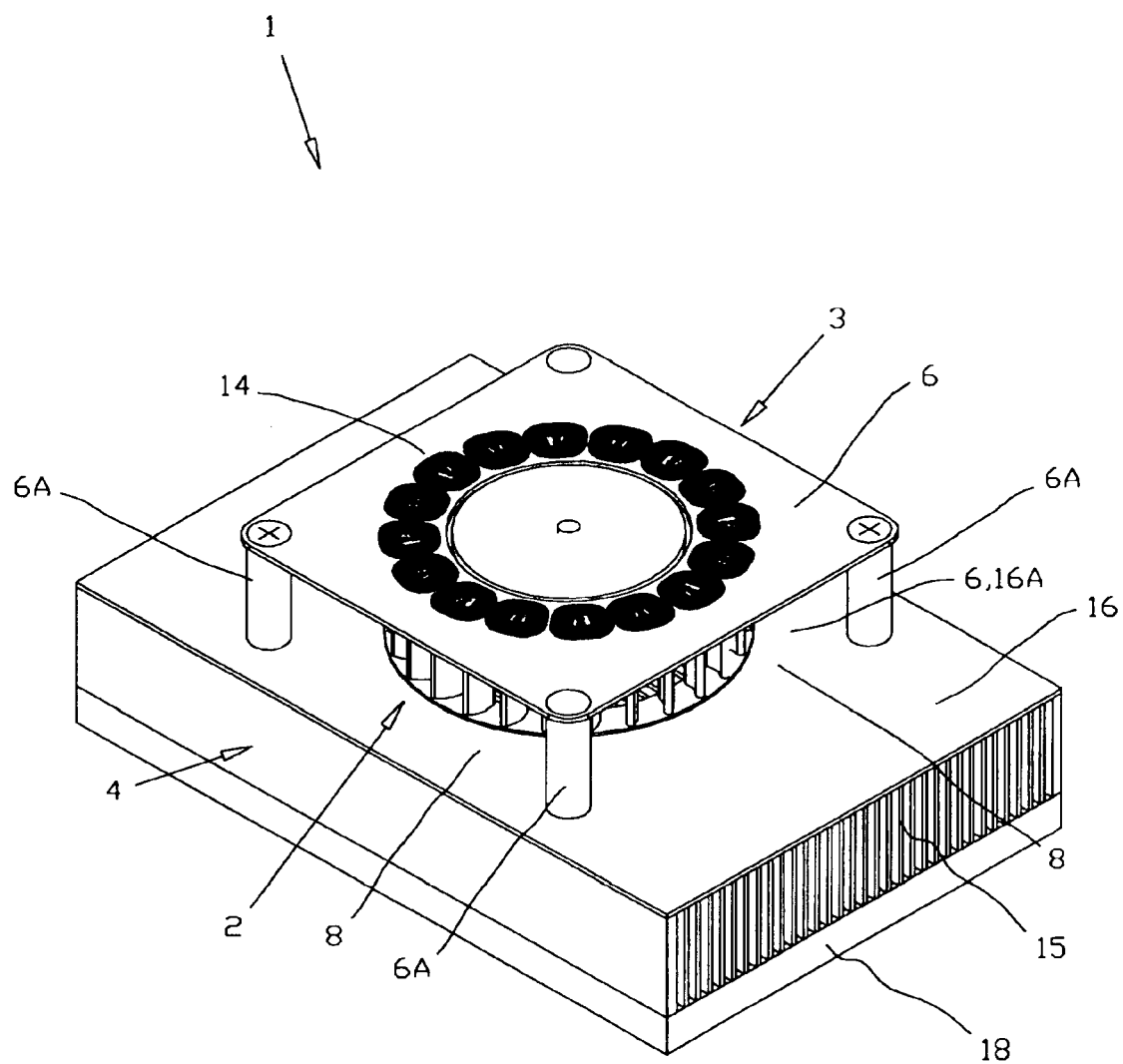
FIG. 5 is a perspective view showing the fifth embodiment of the integrated blade cooler for electronic components when the side part of the casing is made from several elements located at distances one from another.

The integrated blade cooler 1 (FIGS. 1–6A) for electronic components (not shown) in all embodiments comprises a blower 2, an electric drive 3, and a heatsink 4. The blower 2 comprises a radial impeller 5 and a casing 6 with an inlet 7 and outlet 8. The radial impeller 5 that is made as a drum type impeller comprises magnetic blades 9, a backplate disk 10, a shroud 11 and an axis of rotation 12. The electric drive 3 comprises a magnetic rotor 13 and a stator 14 made as printed circuit board. The heatsink 4 comprises heat-exchanging means 15 clothed in a cover plate 16 with an outflow opening 17, and the base 18 providing the thermal contact with said electronic components and with the heat-exchanging means 15. The part 16A of the cover plate 16 is made as a part of the casing 6. As a result, outflow opening 17 of the heatsink 4 serves as the inlet 7 of the casing 6 of the blower 2 so that cooling gas flows through the heat-exchanging means 15, the blower inlet 7, the radial impeller 5, and the blower outlet 8 in a series way. The stator 14 of the electric drive 3 is located perpendicularly to the axis of rotation 12 and is made as part of the casing 6 of the blower 2. The radial impeller 5 comprises magnetic means so that it serves as a magnetic rotor 13 of the electric drive 3,—it's blades 9 and backplate disk 10 are magnetized in the direction parallel to the axis of rotation 12. The heat-exchanging means made as fins (FIGS. 1, 1A, 2–6A) or pins (FIG. 1B).

In the first embodiment (FIGS. 1, 1A, 1B) the stator 14 is located on the side 19 of the blower 2 opposite to the heatsink 4. The shroud 11 of the radial impeller 5 made from the magnet-conducting material and contacts with the magnetic blades 9. It additionally strengthens the magnetic field of the electric drive 3.

In the second variant (FIG. 2) of this cooler stator 14 is made as a part 16A of the cover plate 16 of the heatsink 4, so said stator 14 is located on the side of the blower 2 facing the heatsink 4. In this case the cooler 1 comprises the magnetic insulation 21 between the stator 14 and the heatsink 4, and the shroud 11 is magnetized in the direction parallel to the axis of rotation 12.

In the third variant (FIGS. 1, 3) the electric drive 3 of the cooler 1 comprises two stators,—stator 14 located on the side 19 of the blower 2 opposite to the heatsink 4 and an additional stator 14A made as a part 16A of the cover plate 16 of the heatsink 4. The blades 9, the backplate disk 10 and the shroud 11 are magnetized in said direction.

In the fourth variant (FIG. 4) of this cooler side part 6A of the casing 6 has two outlets—the outlet 8 and an additional outlet 8A located on the opposite sides of the blower 2.

In the fifth variant (FIG. 5) of this cooler side part 6A of the casing 6 are made not solid but from several pillars (spacers with fasteners) that fasten the stator 14 (the upper part of the casing 6) to the cooler 1. Said pillars are located at distances one from another so that the blower 2 has several outlets 8,—in this case the sides of the blower 2 are essentially open, that significantly reduces the quantity of the material.

In the sixth variant of this cooler (FIGS. 6, 6A) the heatsink 4 has a recess 20 on the side of an outflow opening 17 in the central part of said heatsink 4, and the blower 2 is located in said recess 20. The depth of the recess 20 is so that the side 6B of the casing 6 (of the blower 2), opposite to the heatsink 4, and the stator 14, that made in this case as the said part 6B of the casing 6, are located in the same level as the cover plate 16 of the heatsink 4, more exactly,—in the same level as its part 16B that covers the parts of the heatsink 4 surrounding recess 20.

The integrated blade cooler 1 for electronic components operates in the following way. When electric power is supplied to the stator 14 of the electric drive 3, alternate electromagnetic fields are created. These electromagnetic fields interact with a magnetic field created by the magnetic means of impeller 5,—magnetic blades 9 and magnetic backplate disk 10,—which serve as the magnetic rotor 13 of the electric drive 3. As a result the impeller 5 is rotated in respect to the axis of rotation 12. Cooling gas starts moving and flows through heat-exchanging means 15 of the heatsink 4. Heat generated by electronic components transfers to the base 18 due its thermal contact and spread to the heat-exchanging means 15. As cooling gas flows through the heat-exchanging means 15 the intensive process of heat exchange takes place. The total amount of heat taken away by the gas going in a series way through the heatsink 4, it's outflow opening 17, the inlet 7 of the blower 2, the blower 2, and the outlet 8 of the blower 2 to the ambient air depends on the temperature difference between cooling gas and heat-exchanging means 15, the surface coefficient of heat transfer and on the surface of the heat-exchanging means 15.

Thickness of this cooler 1 in these embodiments shown on FIGS. 1–5 is less than in the all known coolers because the stator 14 of the electric drive 3 and the cover plate 16 of the heatsink 4 are made as the parts of the existing casing 6 of the blower 2, and the radial impeller 5 with the magnetic means,—the blades 9 and the backplate disk 10 (and also the shroud 11 in the variant when the stator 14 made as a part of the cover plate 16),—plays the additional function as a magnetic rotor 13 of the electric drive 3 so that the cooler 1 can work without a special separate blower. Working together these elements essentially lower the thickness and also lower the quantity of the material of the cooler device (that is additionally lowered when the side part 6A of the casing 6 made as several elements like pillars located on the distances one from another, thus forming several outlets 8 of the blower 2, so the sides of the blower 2 are essentially open).

Figure 6:
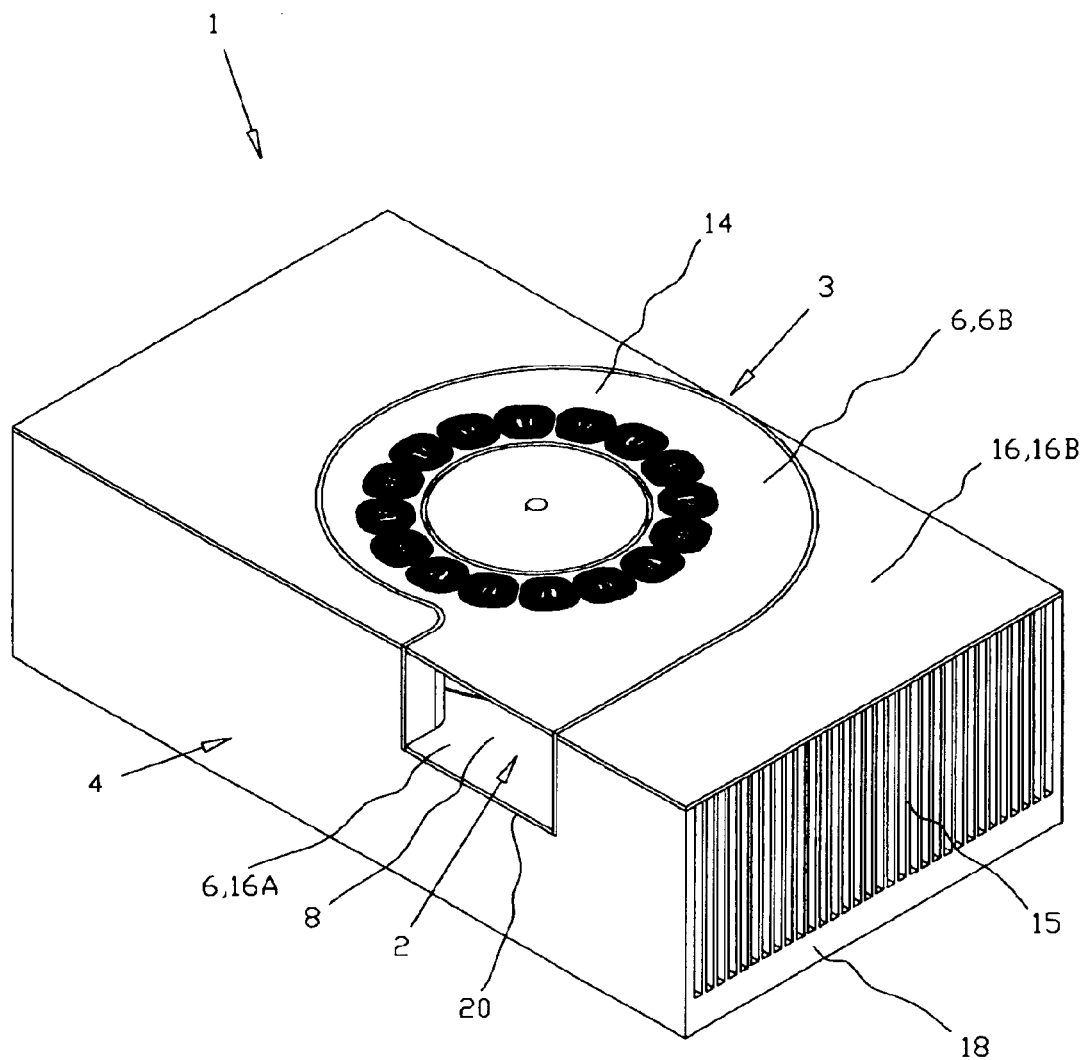
FIG. 6 is a perspective view showing the sixth embodiment of the integrated blade cooler for electronic components when the heatsink has a recess on the side of an outflow opening, and the blower is located in the said recess.
Figure 6A:
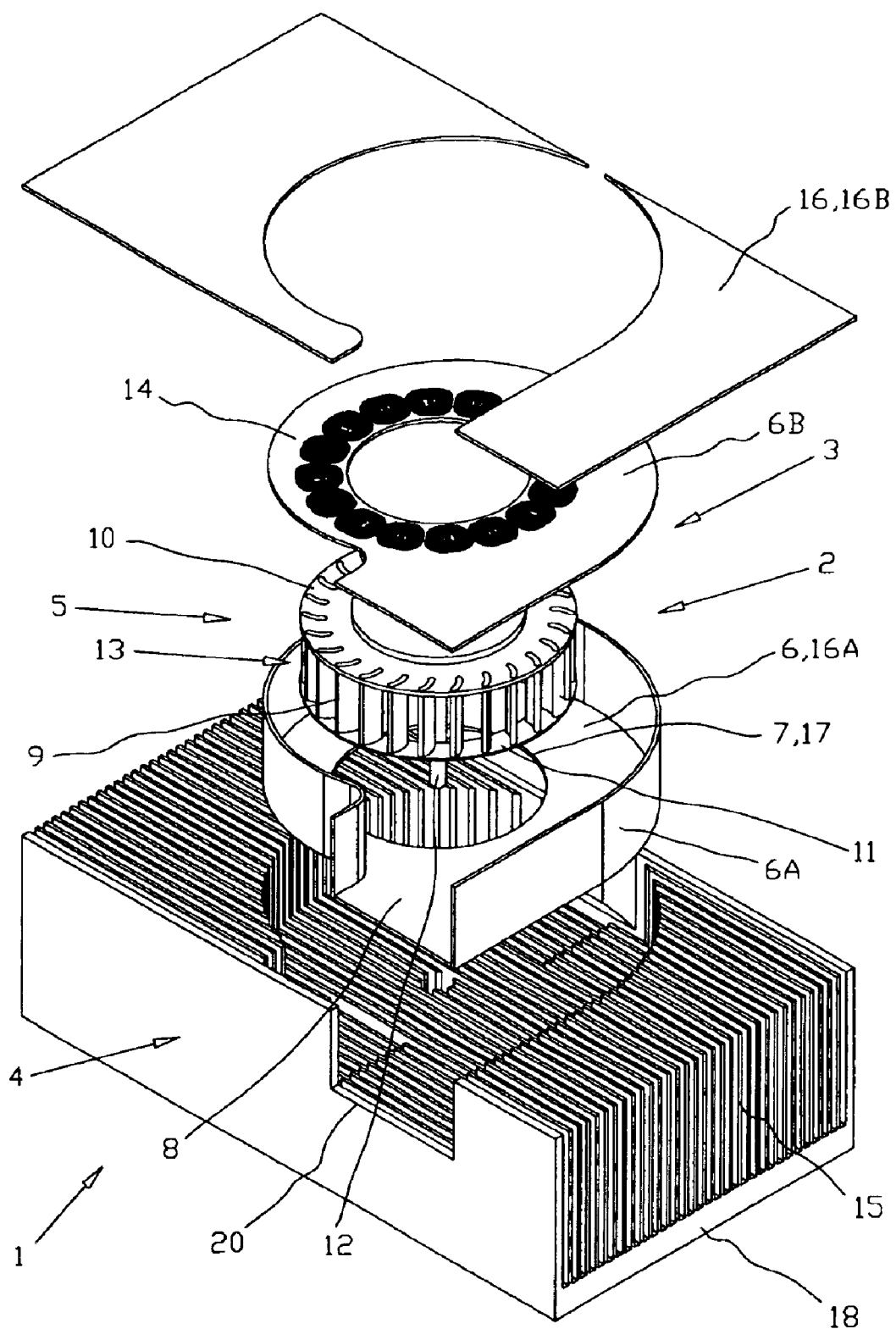
FIG. 6A is an exploded view showing the sixth embodiment of the integrated blade cooler for electronic components.

The maximum effect gives the embodiment of the cooler 1 shown on FIGS. 6 and 6A. Thickness of this cooler 1 is much less because the blower 2 is located in the recess 20 of the heatsink 4. The minimal thickness, significantly less than thickness of any other possible variants of the coolers, is when a depth of said recess 20 is so that the side 6B of the casing 6 of said blower 2, opposite to said heatsink 4, located in about the same level as said cover plate 16 of the heatsink 4. In this case the depth of the cooler 1 is equal to the depth of the heatsink 4. The variant when the recess 20 with the blower 2 is located in the central part of the heatsink 4 gives the maximum heat-exchanging surface and, as a result, the maximum cooling effect and/or minimum size of heatsink 4.

We claim:

1. An integrated blade cooler for electronic components comprising a blower, an electric drive and a heatsink, wherein:
   (i) said blower comprising a radial impeller and a casing with an inlet and an outlet;
   (ii) said radial impeller comprising blades, a backplate disk and an axis of rotation;
   (iii) said electric drive comprising a magnetic rotor and a stator made as a part of said casing and located perpendicularly to said axis of rotation;
   (iv) at least part of said blades being magnetized in the direction parallel to said axis of rotation and serving as said magnetic rotor;
   (v) said heatsink comprising heat-exchanging means and a base providing thermal contact with said electronic component and said heat exchanging means;
   (vi) said heat-exchanging means being clothed in a cover plate with an outflow opening;
   (vii) said outflow opening being coincided with said inlet, thus cooling gas flows through said heat-exchanging means, said inlet, said radial impeller, and said outlet in a series way.

2. The cooler as claimed in claim 1, wherein said stator being made as a printed circuit board.

3. The cooler as claimed in claim 1, wherein at least part of said cover plate being made as a part of said casing so that said outflow opening serves as said inlet.

4. The cooler as claimed in claim 1, wherein said radial impeller further comprising a shroud made from the magnet-conducting material that contacts with said blades.

5. The cooler as claimed in claim 1, wherein said backplate disk being magnetized.

6. The cooler as claimed in claim 1, wherein said radial impeller further comprising a magnetic shroud.

7. The cooler as claimed in claim 1, wherein said radial impeller being made as a drum type impeller.

8. The cooler as claimed in claim 1, wherein said stator being located on the side of said blower opposite to said heatsink.

9. The cooler as claimed in claim 1, wherein said stator being made as a part of said cover plate.

10. The cooler as claimed in claim 9, further comprising a magnetic insulation between said stator and said heatsink.

11. The cooler as claimed in claim 1, further comprising an additional stator being made as part of said casing and located perpendicularly to said axis of rotation, said additional stator and said stator being located on the opposite sides of said blower.

12. The cooler as claimed in claim 1, wherein said casing further comprising an additional outlet located opposite to said outlet.

13. The cooler as claimed in claim 1, wherein a side part of said casing being made as at least three elements like pillars.

14. The cooler as claimed in claim 1, wherein said heat-exchanging means being pins or/and fins.

15. The cooler as claimed in claim 1, wherein said heatsink comprising a recess on the side of said outflow opening, and said blower being located in said recess.

16. The cooler as claimed in claim 15, wherein the depth of said recess is so that the side of said casing opposite to said heatsink being located in about the same level as said cover plate of said heatsink.

17. The cooler as claimed in claim 15, wherein said recess with said blower being located at the central part of said heatsink.

* * * * *